United States Patent
Aoyagi et al.

(10) Patent No.: US 10,700,627 B2
(45) Date of Patent: Jun. 30, 2020

(54) POWER CONVERTER AND ELECTRIC POWER STEERING APPARATUS

(71) Applicant: HITACHI AUTOMOTIVE SYSTEMS, LTD., Ibaraki (JP)

(72) Inventors: Shigehisa Aoyagi, Tokyo (JP); Tomonobu Koseki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/773,877

(22) PCT Filed: Oct. 31, 2016

(86) PCT No.: PCT/JP2016/082284
§ 371 (c)(1),
(2) Date: May 4, 2018

(87) PCT Pub. No.: WO2017/077981
PCT Pub. Date: May 11, 2017

(65) Prior Publication Data
US 2019/0074790 A1   Mar. 7, 2019

(30) Foreign Application Priority Data
Nov. 5, 2015 (JP) ................. 2015-217197

(51) Int. Cl.
*H02M 7/493* (2007.01)
*H02P 27/08* (2006.01)
(Continued)

(52) U.S. Cl.
CPC .............. *H02P 27/08* (2013.01); *H02P 25/22* (2013.01); *H02P 27/06* (2013.01); *H02P 29/028* (2013.01); *H02P 29/032* (2016.02)

(58) Field of Classification Search
CPC .......... H02P 27/06; H02P 27/08; H02M 7/493
See application file for complete search history.

(56) References Cited

U.S. PATENT DOCUMENTS

2010/0017063 A1   1/2010   Maeda
2011/0074333 A1*  3/2011   Suzuki ................. B62D 5/0403
                                                        318/724
(Continued)

FOREIGN PATENT DOCUMENTS

JP   2009-006963 A   1/2009
JP   2011-078230 A   4/2011
(Continued)

OTHER PUBLICATIONS

International Search Report for WO 2017/077981 A1, dated Jan. 24, 2017.

*Primary Examiner* — Cortez M Cook
(74) *Attorney, Agent, or Firm* — Volpe and Koenig, P.C.

(57) ABSTRACT

To control an inverter in the event of an arm failure of a power converter, fluctuation in an output torque is suppressed, and reduction of a total output caused by the failure is suppressed by distributing an output into a plurality of inverters. A power converter for driving a redundant motor having a pair of first and second independent coils, includes: a first inverter circuit connected to the first coil; a second inverter circuit, independent from the first inverter circuit, connected to the second coil; and a first phase relay provided between the first inverter circuit and the first coil. When any one of a plurality of arms of the first inverter circuit fails, the first phase relay shuts off conduction between the failed arm and the first coil, and the redundant motor is driven by operating the second inverter circuit and the remaining arms of the first inverter circuit.

10 Claims, 8 Drawing Sheets

(51) Int. Cl.
    *H02P 29/032*    (2016.01)
    *H02P 25/22*    (2006.01)
    *H02P 27/06*    (2006.01)
    *H02P 29/028*    (2016.01)

(56) References Cited

U.S. PATENT DOCUMENTS

| | | | |
|---|---|---|---|
| 2013/0009580 A1* | 1/2013 | De Wergifosse | H02M 7/493 318/400.26 |
| 2014/0055059 A1* | 2/2014 | Uryu | H02P 27/06 318/9 |
| 2017/0349207 A1 | 12/2017 | Maeshima | |
| 2018/0006594 A1 | 1/2018 | Furukawa et al. | |

FOREIGN PATENT DOCUMENTS

| | | |
|---|---|---|
| JP | 2015-039256 A | 2/2015 |
| WO | 2016/072432 A1 | 5/2016 |
| WO | 2016/135805 A1 | 9/2016 |

* cited by examiner

POWER CONVERTER AND ELECTRIC POWER STEERING APPARATUS

TECHNICAL FIELD

The present invention relates to a power converter and an electric power steering apparatus having the power converter, and more particularly, to a power converter having a plurality of inverter circuits connected in parallel.

BACKGROUND ART

A power converter such as an inverter controls an electric current of a multi-phase dynamoelectric machine using a pulse width modulation (PWM) scheme. When the dynamoelectric machine is a three-phase motor, an electric current of the three-phase coil is controlled by comparing voltage command values applied to each of the three-phase coils and a carries signal serving a reference of the PWM and switching an ON/OFF state of a switching element of the three-phase inverter. An output torque and a rotation speed of the three-phase motor are controlled to desired values on the basis of the currents of the three-phase coils.

A three-phase inverter widely employed in the art includes three legs, in which upper and lower arms are formed using a pair of switching elements vertically connected in series, and a pair of the arms constitute a single leg. A single leg corresponds to one of the three phases, and the three legs corresponding to the three phases have a phase difference set to an electrical angle of 120° and are controlled to output an AC voltage and an AC current of a single cycle (having an electrical angle of 360°).

As a failure occurs in the three-phase inverter, a short circuit or an open circuit is generated in the arms. The failures mean whether the switching element state for the failed arm is short-circuited or open-circuited after the failure. In the case of the open circuit, it is difficult to turn on the failed arm and apply a desired voltage. In comparison, in the state of the short circuit, the failed arm is turned on at all times. Therefore, it is difficult to turn off the failed arm, and a regenerative current flows depending on a phase of the rotor of the motor. As a result, a brake torque is generated in the motor.

Related Art 1 of PTL 1 discusses a problem regarding a brake torque of a failed channel in an inverter and a motor having a plurality of channels. As a solution, PTL 1 introduces a method of driving non-failed channels to reduce a brake torque by setting all 5169049-1 phases of the failed channels to OFF.

CITATION LIST

Patent Literature

PTL 1: JP 2011-078230 A

SUMMARY OF INVENTION

Technical Problem

PTL 1 discusses a technique of canceling the brake torque generated even by setting all phases of the failed channel to OFF using a torque or current command value obtained by inverting brake torque in the non-failed channel. However, assuming that an upper limit of the torque that can be output from a single channel is set to 100%, a single channel generates two channel outputs including the failed channel, so that two channels make a maximum output of 50%. In addition, in some cases, a total output of two channels becomes lower than 50% depending on a brake torque generation amount. When it is desired to obtain a torque output of 50%, a torque fluctuation occurs disadvantageously. This problem is not discussed in the related art. That is, in the method of Related Art 1, when the inverter is driven using a plurality of channels, it is difficult to obtain both suppression of the brake torque generated in the failed channel and the outputs of N channels (100×(N−1)/N) [%] (where "N" denotes an integer equal to or greater than "2").

In view of the aforementioned problems, an object of the invention is to control an inverter such that, in the event of an arm failure of the power converter, a fluctuation in the output torque is suppressed, and reduction of a total output caused by the failure is suppressed by distributing the output into a plurality of inverters.

Solution to Problem

A power converter according to the present invention is for driving a redundant motor having a pair of first and second independent coils, and the power converter includes: a first inverter circuit connected to the first coil; a second inverter circuit connected to the second coil and provided independently from the first inverter circuit; and a first phase relay provided between the first inverter circuit and the first coil, wherein, when any one of a plurality of arms of the first inverter circuit is failed, the first phase relay shuts off conduction between the failed arm and the first coil, and the redundant motor is driven by operating the second inverter circuit and the remaining arms of the first inverter circuit.

Advantageous Effects of Invention

According to the invention, it is possible to control the inverter such that, in the event of an arm failure of the power converter, a fluctuation in the output torque is suppressed, and reduction of a total output caused by the failure is suppressed by distributing the output into a plurality of inverters.

DESCRIPTION OF EMBODIMENTS

A power converter according to an embodiment of the invention will now be described with reference to the accompanying drawings. Note that, in each drawing, like reference numerals denote like elements, and they will not be described repeatedly.

First Embodiment

Figure 1:
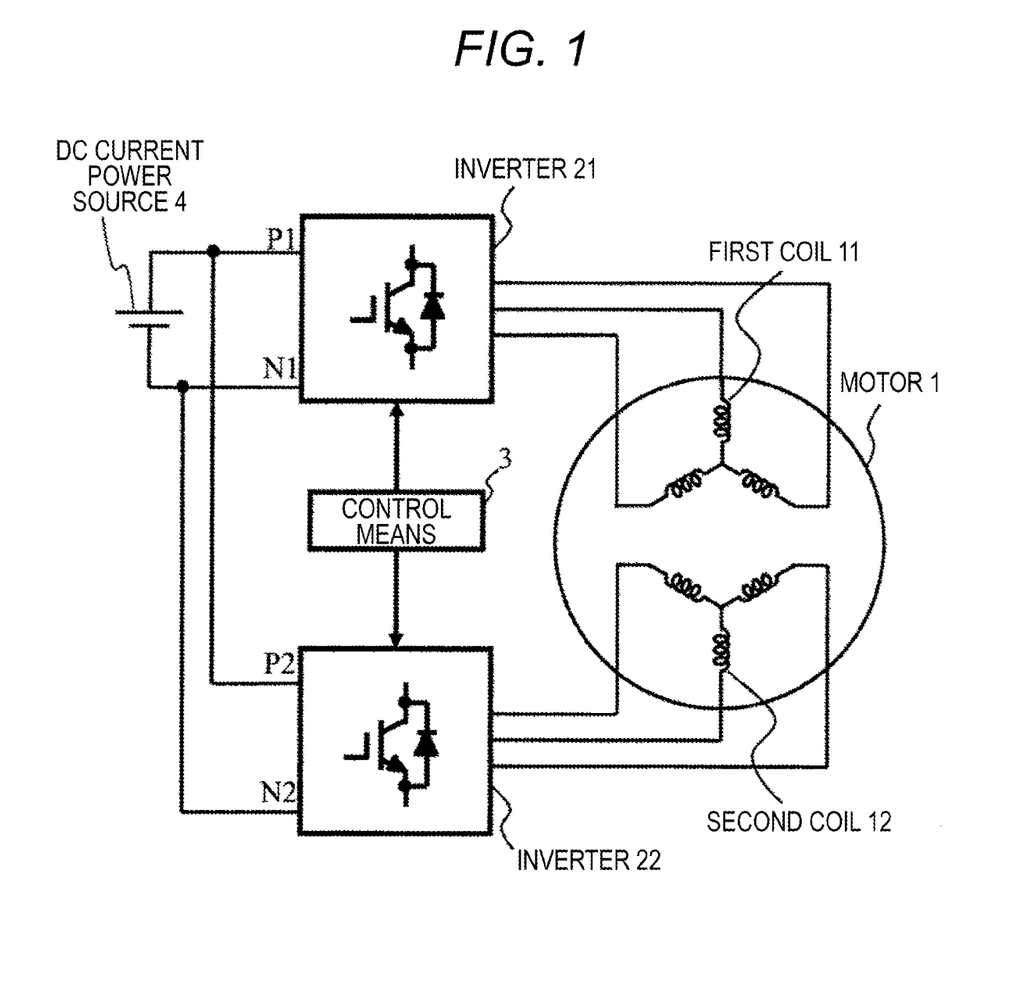
FIG. 1 illustrates a whole configuration according to a first embodiment.

FIG. 1 illustrates a whole configuration including a power converter and a dynamoelectric machine according to a first embodiment of the invention. According to the first embodiment, it is assumed that an inverter circuit as a power converter has a two channels by way of example. However, the invention may similarly apply to a plurality of "N" channels (where "N" denotes an integer equal to or greater than "2").

A motor 1 of FIG. 1 has a pair of independent first and second coils 11 and 12. The motor 1 has a magnetic circuit that shares a single rotor with stators.

A first inverter 21 is connected to the first coil 11. A second inverter 22 is connected to the second coil 12. The first and second inverters 21 and 22 are driven on the basis of a drive signal output from a control means 3. In addition, the first and second inverters 21 and 22 are connected to a DC current power source 4 in parallel. The first and second inverters 21 and 22 convert a DC current input from the DC current power source 4 into an AC current and outputs the AC current to the motor 1.

Figure 2:
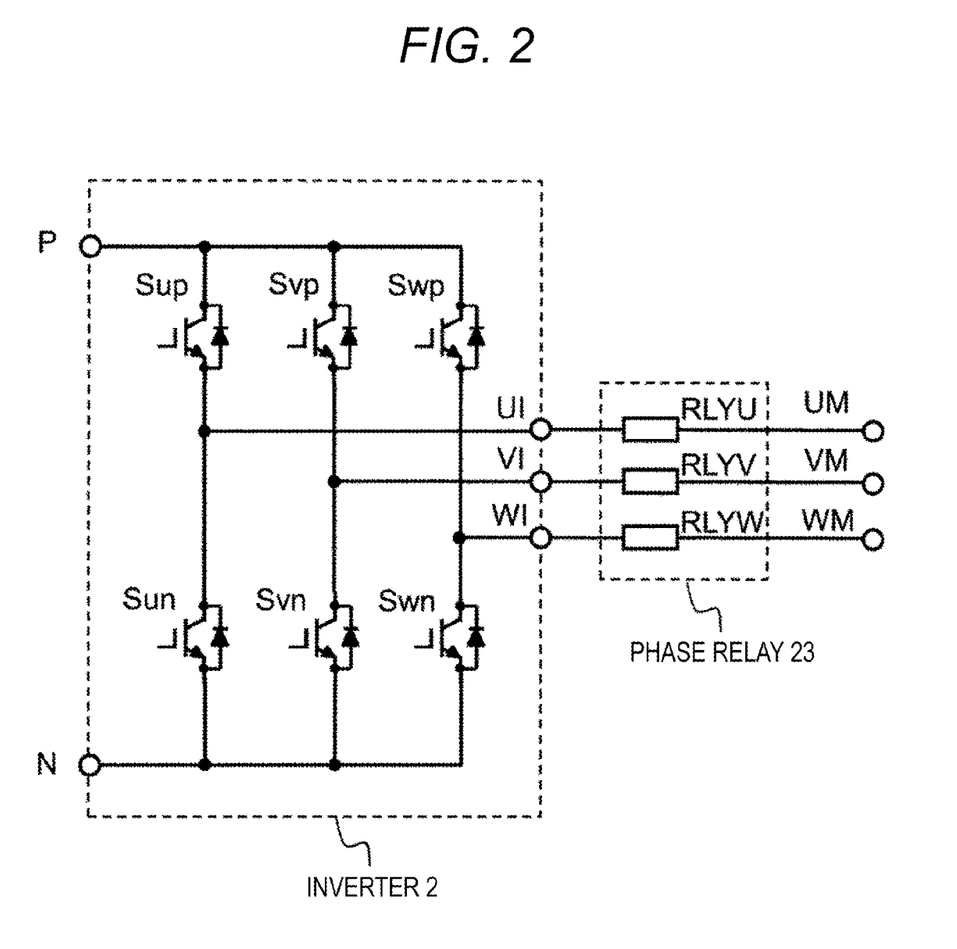
FIG. 2 illustrates a circuit configuration of an inverter.

FIG. 2 illustrates circuit configurations of the first and second inverters 21 and 22. Here, the first and second inverters 21 and 22 are collectively illustrated as an inverter 2 because they have the same circuit configuration. The inverter 2 of FIG. 2 includes main circuits of the first and second inverters 21 and 22.

The inverter 2 receives a DC current from positive and negative inputs P and N and outputs a three-phase AC current including a U-phase output UI, a V-phase output VI, and a W-phase output WI. The U-phase output UI is connected to upper and lower arms Sup and Sun. The V-phase output VI is connected to upper and lower arms Svp and Svn. The W-phase output WI is connected to upper and lower arms Swp and Swn.

The inverter 2 is connected to the motor 1 via a phase relay 23. The phase relay 23 includes a U-phase relay RLYU connected to the U-phase output UI, a V-phase relay RLYV connected to the V-phase output VI, and a W-phase relay RLYW connected to the W-phase output WI. The phase relay 23 may include a mechanical contact relay or an electronic contactless relay using a switching element. This phase relay 23 is opened in the event of a failure in the inverter 2 or the motor 1 to suppress generation of a brake torque in the motor 1.

The control means 3 of FIG. 1 determines an output for controlling a torque and a rotation speed of the motor 1 on the basis of a detection value of the current flowing through the first and second coils 11 and 12 of the motor 1 and phase information of the rotor of the motor 1. In addition, the control means 3 generates a drive signal for driving switching elements of the first and second inverters 21 and 22. This drive signal is an AC signal having a voltage command value or a current command value with a desired drive waveform and is given as a switching signal having binary values ON and OFF of the inverter element by PWM modulating a carrier signal.

Here, a current value of the motor 1 may be obtained using any one of methods of implementing a three-phase current from a current value flowing to a phase current sensor that detects the three-phase current value or a shunt resistance connected in series between the DC current power source 4 and the first and second inverters 21 and 22 (N1 and N2). In addition, a detection means of the phase information of the rotor of the motor 1 may include a resolver, a giant magnetoresistance (GMR) sensor, a tunnel magnetoresistance (TMR) sensor, an encoder, a Hall IC, and the like. Alternatively, the detection means may include a phase estimation means based on a so-called rotation position sensorless control using a voltage generated from the motor 1 or location dependence of the rotor.

Figure 3:
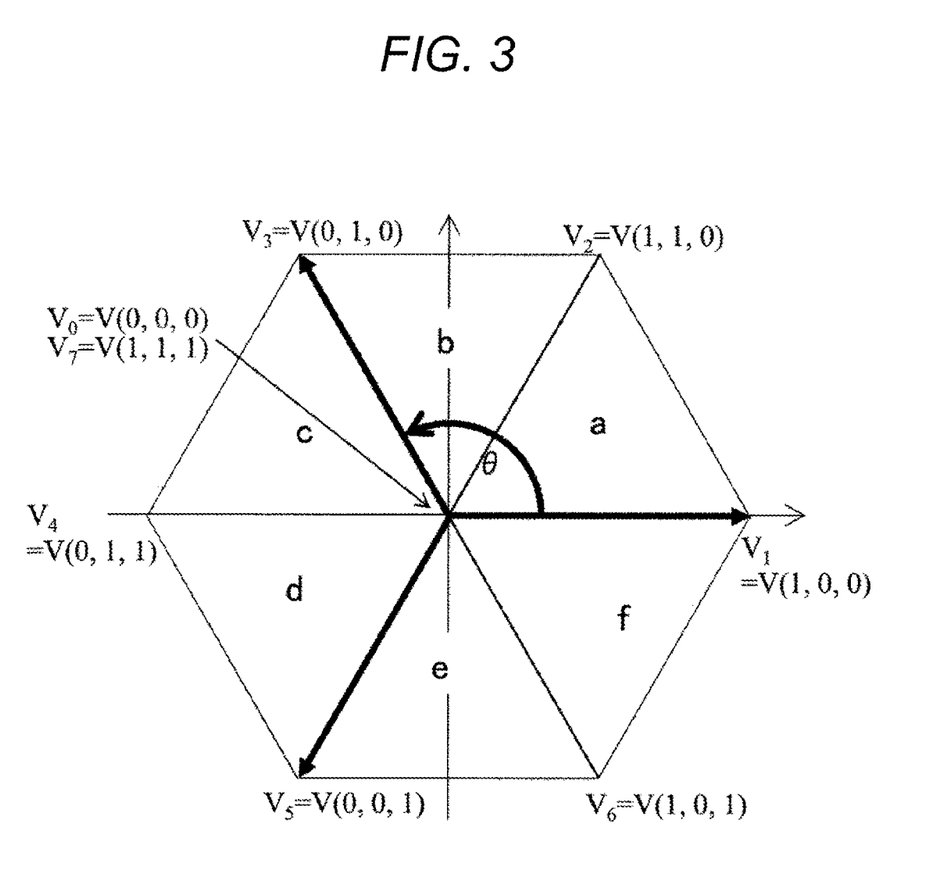
FIG. 3 illustrates output vectors of the inverter.

FIG. 3 illustrates output vectors of the inverter 2. The three-phase output vectors are controlled to output a voltage having a phase of 120° (electrical angle). The output vectors include vectors V1 to V6 and vectors V0 to V7 expressed in Formula 1. For example, the vector V1 is defined as "V(1, 0, 0)" in Formula 1, and this means that an U-phase upper arm is turned on, and V-phase and W-phase lower arms are turned on. Here, the output vector tin will be expressed in order of the U-phase, the V-phase, and the W-phase, the ON state of the upper arm will be denoted by "1", and the OFF state of the upper arm will be denoted by "0". In this case, the OFF state of the lower arm will be denoted by "0", and an ON state of the lower arm will be denoted by "1". In addition, it is assumed that a dead time is negligible.

In this manner, a rotating magnetic field of the motor 1 can be generated by controlling the output vector within a phase range from "a" to "f" obtained by dividing 360° by an angle of 60° six times.

$$\begin{cases} V_0 = V(0, 0, 0) \\ V_1 = V(1, 0, 0) \\ V_2 = V(1, 1, 0) \\ V_3 = V(0, 1, 0) \\ V_4 = V(0, 1, 1) \\ V_5 = V(0, 0, 1) \\ V_6 = V(1, 0, 1) \\ V_7 = V(1, 1, 1) \end{cases} \quad \text{[Formula 1]}$$

Figure 4:
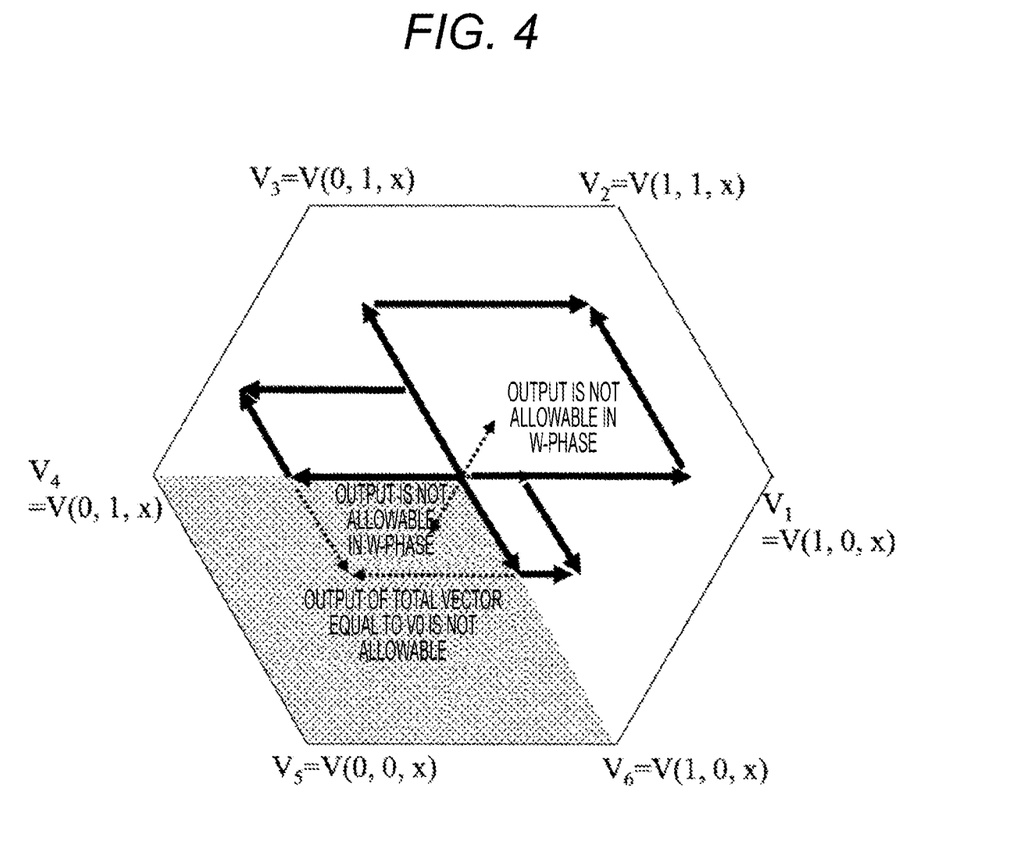
FIG. 4 illustrates an output vector of the inverter in the event of a failure in a single phase.

FIG. 4 illustrates a case where any one of the upper and lower arms of the W-phase is failed, or it is difficult to generate the W-phase output vector by turning off the W-phase relay RLYW of the phase relay 23. It becomes difficult to output the vector V5 due to a failure of the W-phase. In addition, it is difficult to generate an output vector within the sections "d" and "e" having a range of 120° in FIG. 4.

Figure 5:
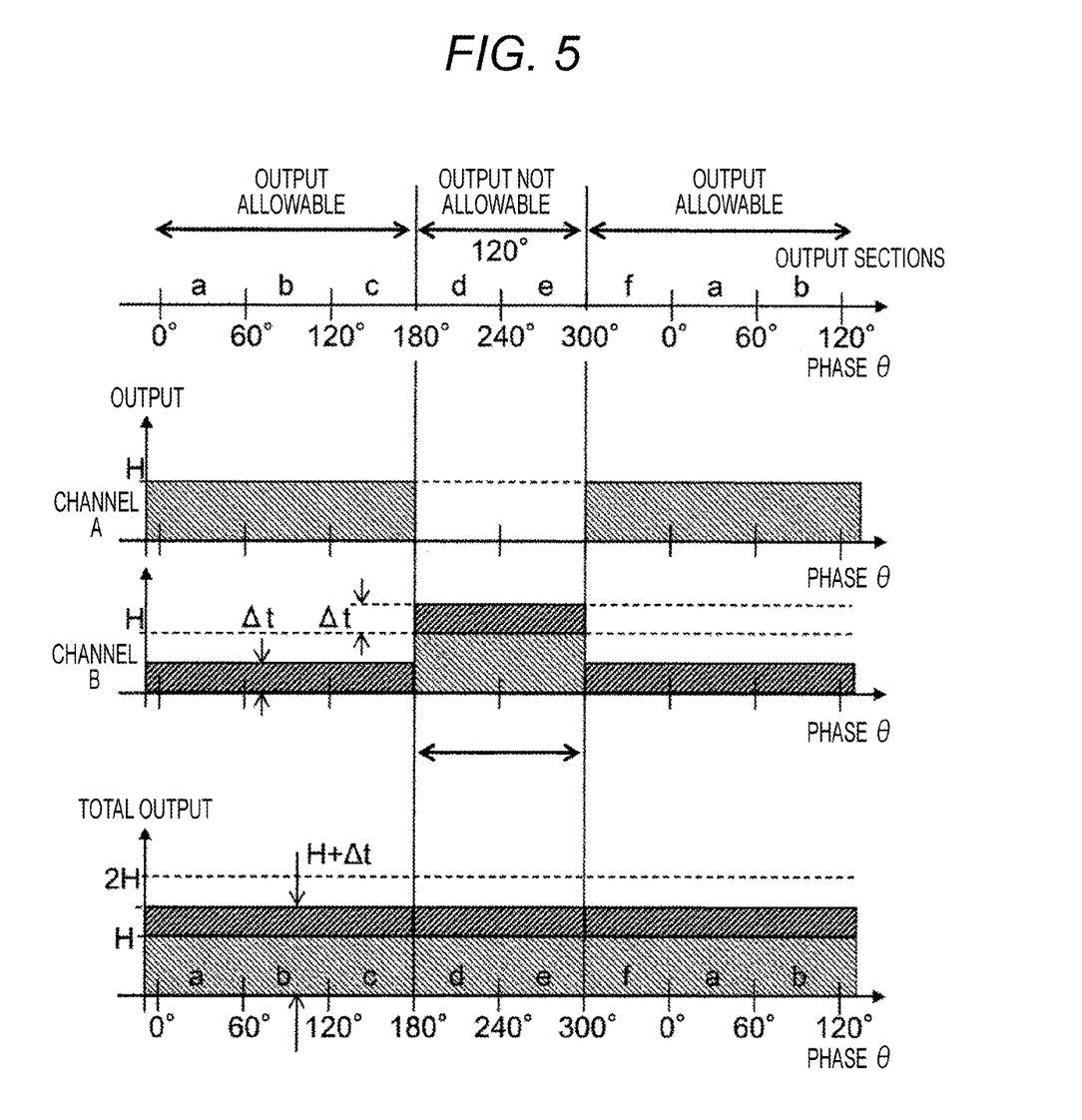
FIG. 5 illustrates inverter outputs of two channels.

FIG. 5 illustrates phases of the output vector. In the case of the W-phase failure in FIG. 4, the output is not allowable in sections "d" and "e" of the phase range, and the output is allowable in the remaining sections "a", "b", "c", and "f". In FIG. 5, it is assumed that the channel A is a W-phase failed channel, and the channel B is a normal channel. Note that one of the channels A and B is the inverter 21 of FIG. 1, and the other channel is the inverter 22.

The failed channel "A" outputs an output value H, but does not output any value or outputs zero in the sections "d" and "e" having a range of 120° due to a W-phase failure. In comparison, in the normal channel "B", an output value Δt is output across a range of 360°, and an output value (H+Δt) obtained by adding the output value H is output within the range of 120° (including the sections "d" and "e") where the output is not allowable in the channel A. As a result, a total output of the channels "A" and "B" is expressed as an output (H+Δt) across overall sections.

The output value Δt is obtained to satisfy the following Formula 2 when an average value of a single phase cycle is equal to or smaller than the maximum value H at a normal time.

$$(H + \Delta t) \cdot \frac{2}{6} + \Delta t \cdot \frac{4}{6} \leq H \cdot \frac{6}{6} \quad \text{[Formula 2]}$$

-continued $$\Delta t \leq \frac{2}{3} \cdot H$$

$$\Delta t \leq H \cdot 66.7\%$$

By setting the output (H+Δt) of Formula 2 not to exceed the upper limit of the allowable current of the switching element, it is possible to output the total output (H+Δt) across a range of 360° while suppressing a fluctuation. As a result, it is possible to perform the control while suppressing a fluctuation in the output torque of the motor 1.

As described above, the power converter according to the first embodiment drives the U-phase and V-phase arms not failed in the channel "A" by shutting off the phase relay RLYW connected to the W-phase arm even when the W-phase arm of the channel "A" is failed. An output of the deficient phase where a failure occurs in the W-phase arm of the channel "A" is compensated to suppress a torque fluctuation in cooperation with the normal channel "B". As a result, it is possible to suppress reduction of the output to the motor while suppressing a brake torque generated in the failed channel.

Second Embodiment

Figure 6:
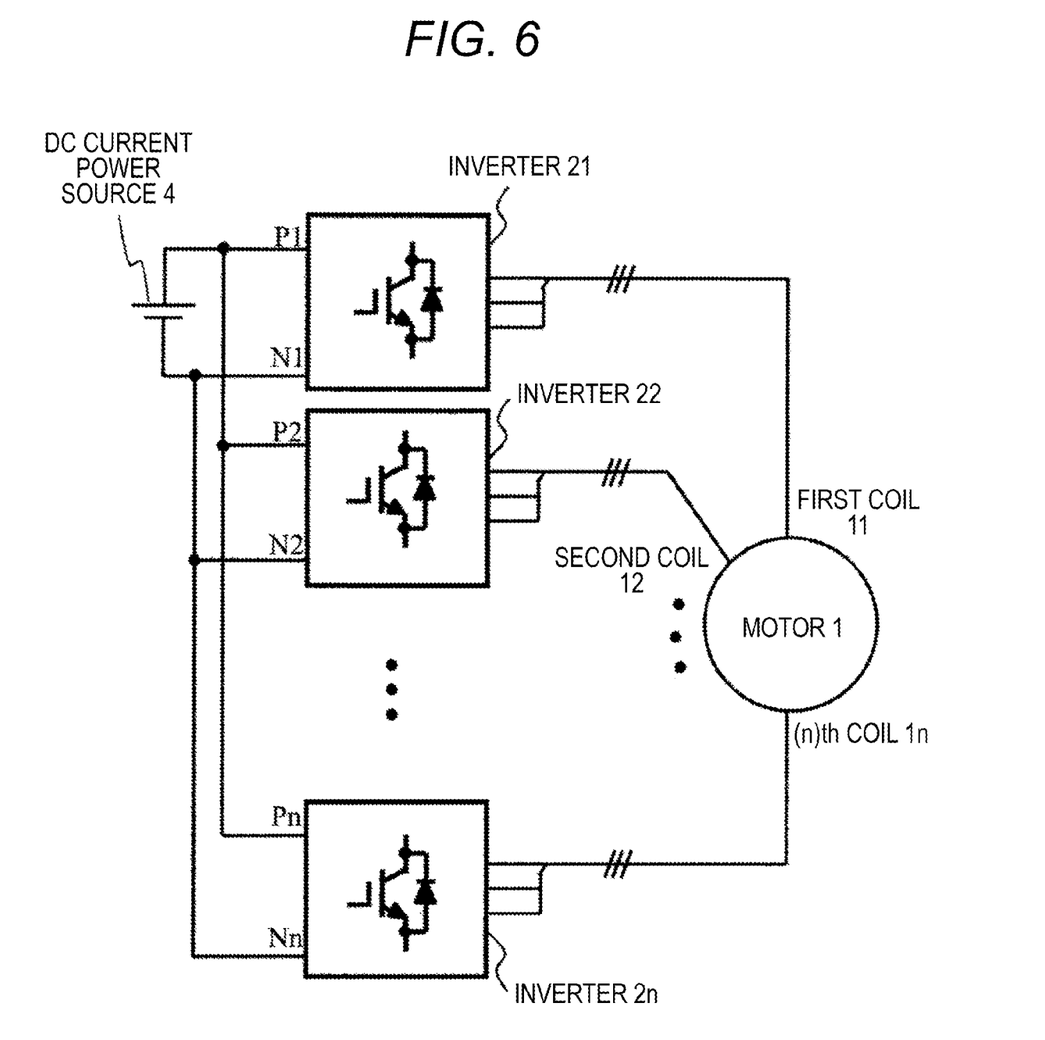
FIG. 6 illustrates a whole configuration according to a second embodiment.

FIG. 6 illustrates a whole configuration of a power converter having "n" channels (where "n" denotes an integer equal to or greater than "2"). According to the second embodiment, the inverters 21, 22, . . . , 2n of the "n" channels are connected in parallel, and the first coil 11, the second coil 12, . . . , and the (n)th coil 1n are independently wound in the motor 1. In this case, the inverter output of each channel can be expressed as FIG. 7.

When any one of the inverters 21, 22, . . . , 2n is failed, and the output of the failed channel is allocated to the remaining channels (n−1), an allocation added to each channel is determined to satisfy Formula 3.

$$\sum_{k=1}^{n-1} \left( \frac{1}{n-1} \cdot H \right) = H \quad \text{[Formula 3]}$$

Figure 7:
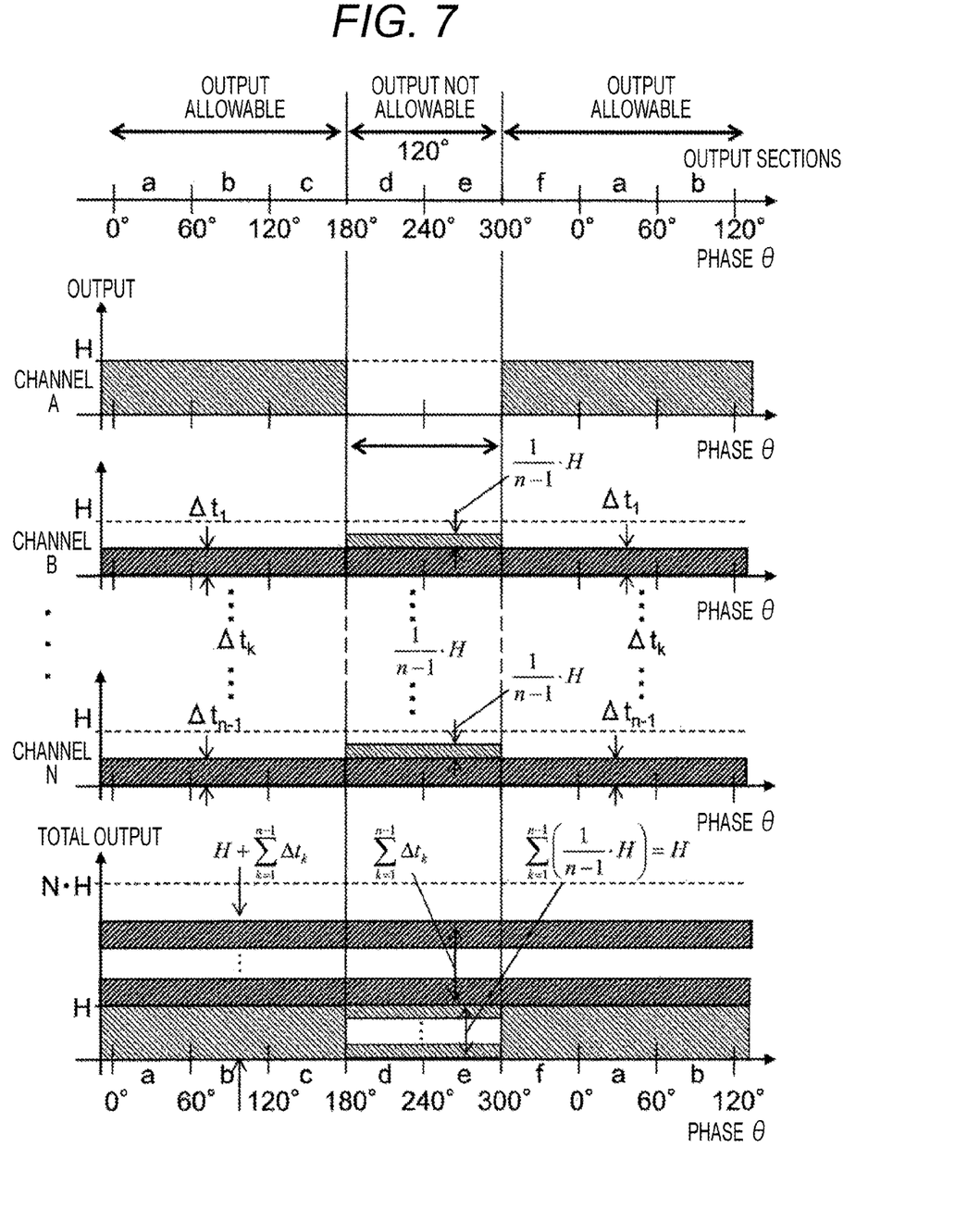
FIG. 7 illustrates inverter outputs of "n" channels.

Assuming that each output of the (n−1) non-failed channels is denoted by "$\Delta t_k$", the allocation and the total of Formula 3 can be expressed as Formula 4.

$$\Delta t_k + \frac{1}{n-1} \cdot H \quad \text{[Formula 4]}$$

As a result, an average output across an electrical angle of 360° may satisfy Formula 5

$$\left( \Delta t_k + \frac{H}{n-1} \right) \cdot \frac{2}{6} + \Delta t_k \cdot \frac{4}{6} \leq H \cdot \frac{6}{6} \quad \text{[Formula 5]}$$

$$\therefore \Delta t_k \leq \frac{3n-4}{3n-3} \cdot H \quad (n \geq 2)$$

That is, it is possible to increase each output $\Delta t_k$ while suppressing a burden of each channel. As a result, it is possible to reduce a burden of each inverter in the "n" channels and increase a total output for a long time.

Third Embodiment

Figure 8:
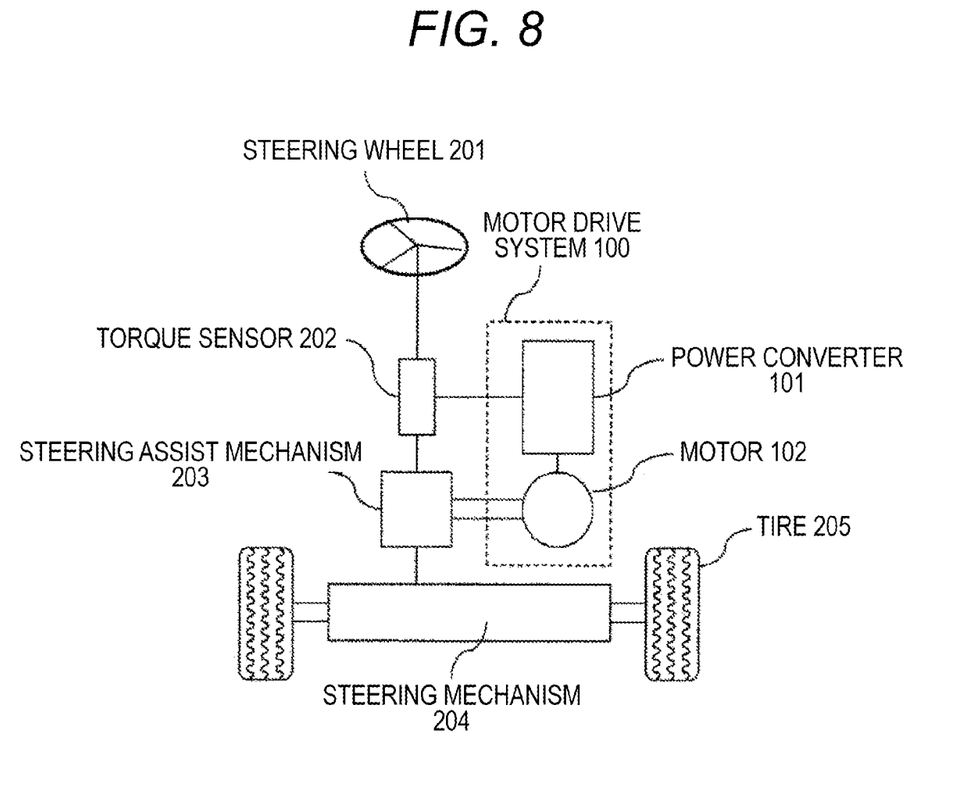
FIG. 8 illustrates a configuration according to a third embodiment.

FIG. 8 illustrates an electric power steering apparatus for steering a vehicle travel direction according to an embodiment of the invention. The electric power steering apparatus has the power converter 101 of the aforementioned embodiment.

As a driver manipulates a steering wheel 201, its steering torque is detected by a torque sensor 202. On the basis of this steering torque, the power converter 101 drives the motor 102. An electrical assist torque caused by the motor 102 is input to a steering assist mechanism 203 to drive a steering mechanism 204 in cooperation with the steering torque from the driver. As a result, the tires 205 are controlled to steer a vehicle travel direction.

In the electric power steering apparatus according to the third embodiment, a torque fluctuation in the motor is suppressed by distributedly outputting a deficient torque to the remaining channels when a failure occurs in a single channel of the power converter 101 having multiple channel inverter circuits. As a result, it possible to drive the motor 102 with high performance and smoothly generate an electric assist steering force depending on a manipulation change of the steering wheel 201.

REFERENCE SIGNS LIST

1 motor
11 first coil
12 second coil
2 inverter
21 inverter
22 inverter
23 phase relay
4 DC current power source
100 motor drive system
101 power converter
102 motor
201 steering wheel
202 torque sensor
203 steering assist mechanism
204 steering mechanism
205 tires

The invention claimed is:

1. A power converter for driving a redundant motor having a pair of first and second independent coils, the power converter comprising:
   a first inverter circuit connected to the first coil;
   a second inverter circuit connected to the second coil and provided independently from the first inverter circuit; and
   a first phase relay provided between the first inverter circuit and the first coil,
   wherein, when any one of a plurality of arms of the first inverter circuit is failed, the first phase relay shuts off conduction between the failed arm and the first coil, and the redundant motor is driven by operating the second inverter circuit and the remaining arms of the first inverter circuit,
   wherein reduction in an output of the failed arm is compensated by operating the second inverter circuit,
   the first inverter circuit outputs substantially zero at a predetermined rotation phase, and
   the second inverter circuit is operated such that an average output at the predetermined rotation phase is larger than an average output at phases other than the predetermined rotation phase.

2. The power converter according to claim 1, wherein a total output of the first inverter circuit and the second inverter circuit in a normal state is nearly constant across a phase range of 360° (electrical angle).

3. The power converter according to claim 1, wherein the predetermined rotation phase is an electrical angle of 120°.

4. The power converter according to claim 1, wherein an output of the second inverter circuit is set such that a value obtained by integrating the output across a phase range of 360° (electrical angle) is equal to or smaller than a value obtained by integrating a 100% output of the second inverter circuit across a phase range of 360° (electrical angle), and a current value of the output does not exceed an upper limit of an allowable current of a switching element of the second inverter circuit.

5. The power converter according to claim 1, wherein a plurality of second inverter circuits are provided.

6. The power converter according to claim 1, wherein the failure is a short-circuit failure.

7. An electric power steering apparatus comprising:
the power converter according to claim 1; and
a steering mechanism for performing steering depending on a steering manipulation change of a steering wheel.

8. A power converter for driving a redundant motor having a pair of first and second independent coils, the power converter comprising:
a first inverter circuit connected to the first coil;
a second inverter circuit connected to the second coil and provided independently from the first inverter circuit; and
a first phase relay provided between the first inverter circuit and the first coil,
wherein, when any one of a plurality of arms of the first inverter circuit is failed, the first phase relay shuts off conduction between the failed arm and the first coil, and the redundant motor is driven by operating the second inverter circuit and the remaining arms of the first inverter circuit,
wherein an output of the second inverter circuit is set such that a value obtained by integrating the output across a phase range of 360° (electrical angle) is equal to or smaller than a value obtained by integrating a 100% output of the second inverter circuit across a phase range of 360° (electrical angle), and a current value of the output does not exceed an upper limit of an allowable current of a switching element of the second inverter circuit.

9. An electric power steering apparatus comprising:
the power converter according to claim 8; and
a steering mechanism for performing steering depending on a steering manipulation change of a steering wheel.

10. The power converter according to claim 8, wherein the failure is a short-circuit failure.

* * * * *